United States Patent
Pyzik et al.

(10) Patent No.: US 7,032,967 B2
(45) Date of Patent: Apr. 25, 2006

(54) STRUCTURAL FOAM AND URETHANE COMPOSITE FOR USE IN A MOTORCYCLE SEAT AND METHOD OF MANUFACTURING THE SAME

(76) Inventors: Matthew R. Pyzik, 1180 Centre Rd., Suite 100, Auburn Hills, MI (US) 48326; John P. Pacella, 2997 Rhineberry, Rochester Hills, MI (US) 48309

( * ) Notice: Subject to any disclaimer, the term of this patent is extended or adjusted under 35 U.S.C. 154(b) by 0 days.

(21) Appl. No.: 10/903,552

(22) Filed: Jul. 30, 2004

(65) Prior Publication Data

US 2006/0022505 A1 Feb. 2, 2006

(51) Int. Cl.
*B62J 1/18* (2006.01)

(52) U.S. Cl. ............ 297/214; 297/DIG. 1; 297/DIG. 2

(58) Field of Classification Search ............ 297/195.1, 297/DIG. 1, DIG. 2, 214, 215.16

See application file for complete search history.

(56) References Cited

U.S. PATENT DOCUMENTS

| 2,303,567 | A | * | 12/1942 | McWhorter et al. | 248/609 |
|---|---|---|---|---|---|
| 3,604,748 | A | * | 9/1971 | Lamkemeyer | 297/214 |
| 3,675,970 | A | | 7/1972 | Bereday | 297/452 |
| 3,833,242 | A | | 9/1974 | Thompson, Jr. | 280/281 |
| 4,332,419 | A | | 6/1982 | Vogel | 297/443 |
| 5,016,941 | A | | 5/1991 | Yokota | 297/452 |
| 5,076,601 | A | | 12/1991 | Duplessis | 280/281.1 |
| 5,236,247 | A | | 8/1993 | Hewko | 297/452.1 |
| 5,544,937 | A | | 8/1996 | Hanagan | 297/215.12 |
| 5,722,729 | A | | 3/1998 | Carilli | 297/452.55 |
| 5,765,912 | A | * | 6/1998 | Bontrager | 297/214 |
| 5,988,757 | A | | 11/1999 | Vishey et al. | 297/452.31 |
| 6,027,171 | A | * | 2/2000 | Partington et al. | 297/452.18 |
| 2003/0228455 | A1 | | 12/2003 | Panczyk et al. | 428/304.4 |

\* cited by examiner

*Primary Examiner*—Milton Nelson, Jr.
(74) *Attorney, Agent, or Firm*—Gifford, Krass, Groh, Sprinkle, Anderson & Citkowski, P.C.

(57) ABSTRACT

A seat for use with a cycle-type vehicle which includes a three-dimensional shaped insert constructed of a foam material. A structural foam backing is secured to a first surface of the foam material. One or more brackets are integrally formed with and extend from the structural backing and which engage given mounting locations of the vehicle. A fabric covering material is applied over a second surface of the foam material.

3 Claims, 6 Drawing Sheets

STRUCTURAL FOAM AND URETHANE COMPOSITE FOR USE IN A MOTORCYCLE SEAT AND METHOD OF MANUFACTURING THE SAME

BACKGROUND OF THE INVENTION

1. Field of the Invention

The present invention relates generally to vehicle seats and, such as in particular, cushioned seating supports for bicycles, motorcycles and the like. More specifically, the present invention discloses a structural foam and urethane composite for use in a motorcycle seat, and which in particular permits the insert molding of associated seat bracketry and the like.

2. Description of the Prior Art

The prior art is well documented with various examples of motorcycle and related vehicle seats. In particular, such conventional seats usually include a soft foam or padded insert which is secured to a metal substrate bracket, in turn secured to the motorcycle frame. A leather or vinyl covering is then typically secured over the soft foam material.

A first example of a motorcycle seat and method of making is set forth in U.S. Pat. No. 5,544,937, issued to Hanagan, and which discloses a unitary, rigid and elongated platform member, exhibiting both driver and passenger seat portions, and which is configured to seat upon and be secured to the frame of the motorcycle. The platform member is further disclosed as being formed by a first layer of a mixture of glass fibers and polyester resin is embedded on the lower element of a mold, which is configured to form the platform member of the seat. Hardware is applied on the first layer and a second layer of glass fiber/resin is applied to the first layer and about the hardware so as to encapsulate at least a portion of the hardware in (between) the layers and which are then partially cured. A foamable synthetic resin is introduced into the lower element of the mold onto the partially cured second layer and the first and second layers are concurrently cured to produce a chemical bond between the glass reinforced layers and foam layer and the composite seat body is removed from the mold and covered with a pliable outer layer of material.

Panczyk, U.S. Patent Application Publication 2003/0228455, teaches a laminate structure for making a seat cushion for a vehicle interior and which includes a high-density form bonded to an interior surface of a seat cover material. A laminate structure is formed into a desired shape for the cushioned component, and which is then inserted into a vacuum mold having a mold surface with a shape corresponding with a desired exterior surface shape of the cushioned component. Liquid foam-forming material is injected into the laminate structure within the mold and allowed to cure to form the cushioned component. The high-density foam may further be created by felting a polyurethane foam.

Vishey, U.S. Pat. No. 5,988,757, teaches a vehicle seat assembly including an aluminum lower seat frame with first and second side supports having a thickness of less than 4 mm through a substantial portion thereof. The seat back frame is pivotally connected to the lower seat frame and comprises a contoured structural reaction injection molded (SRIM) material. In an alternative embodiment, the back frame comprises a plurality of glass mat layers enclosed within a molded urethane material. Extra glass mat layers are provided in high stress concentration areas for added structural integrity.

U.S. Pat. No. 5,236,247, issued to Hewko, teaches an insert molded composite plastic seat cushion frame for a vehicle seat assembly, which is comprised of a metal reinforcing sheet insert molded into a plastic resin. By insert molding a reinforcing material into a low weight and strength plastic resin, a strength comparable to a high strength engineered plastic resin seat cushion frame and a stamped steel seat cushion frame is disclosed as being achieved.

U.S. Pat. No. 4,332,419, issued to Vogel, teaches seating and backrest members mounted on a seat support frame and which are constructed of molded plastic foam members lined with an upholstery material and including reinforcement and mounting frames, which are foamed into the molded plastic members such that they are integral therewith. The support structure has mounting clips projecting into openings in the molded plastic members and engaging the reinforcement and mounting frames therein. With this arrangement, the molded plastic members can be easily exchanged without the use of tools but are, nevertheless, firmly held in position.

U.S. Pat. No. 3,675,970, issued to Bereday, teaches a seat construction having a rigid structure and yieldable padding beneath a desired upholstery covering. The frame is constructed from a stamped sheet material or a plastic laminate and defines an elongated concavity between spaced elongated shoulders. The padding may be a molded foamed material, but is usually a slabbed stock of uniform thickness.

Finally, U.S. Pat. No. 5,722,729, issued to Carilli, teaches a seat cushion system for reducing vertical impact forces and which employs a series of layers of varying density and lateral displacement foams with a rigid or semi-rigid material within the cushion. Each layer of foam is capable of changing in both density and lateral displacement depending on the volumetric space available. An additional embodiment demonstrates the use of two layers of differing densities, from which lateral displacement can greatly reduce the impact force from vertical thrust.

SUMMARY OF THE PRESENT INVENTION

The present invention is a seat for use with a vehicle and which is an improvement over prior art seats of the variety usually including a leather covered and foam insert, to which is attached a metal or other suitable substrate bracket exhibiting rivet attached bracket portions for securing the seat to such as mounting locations associated with a motorcycle. The present invention makes possible the formation of a seat utilizing, in part, a plasticized and structural backing component suitable both for supporting the weight of a rider, as well as securing to given mounting locations associated with a frame of the motorcycle.

The present invention includes a three-dimensional shaped insert constructed of a foam material, a structural foam backing securing to a first surface of the foam material. Any number of brackets may be integrally formed with and extend from the structural backing and for engaging the given mounting locations of the vehicle. In one variant, the brackets include one or more in-molded portions, such as which are configured from the same material as the structural backing member itself.

In a further variant, the brackets are provided as separate, typically metal, in-molded bracket portions which are mechanically secured to and within the structural backing. In either variant, rubber isolators may be disposed between the bracket portions and associated vehicle mounting locations. A fabric covering material is applied over a second surface of the foam material and includes usually a vinyl or leather material.

In a preferred embodiment, the seat exhibits a specified shape and size, with the structural backing constructed of an expanded polypropylene material. The foam material may further be constructed of at least a urethane material.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
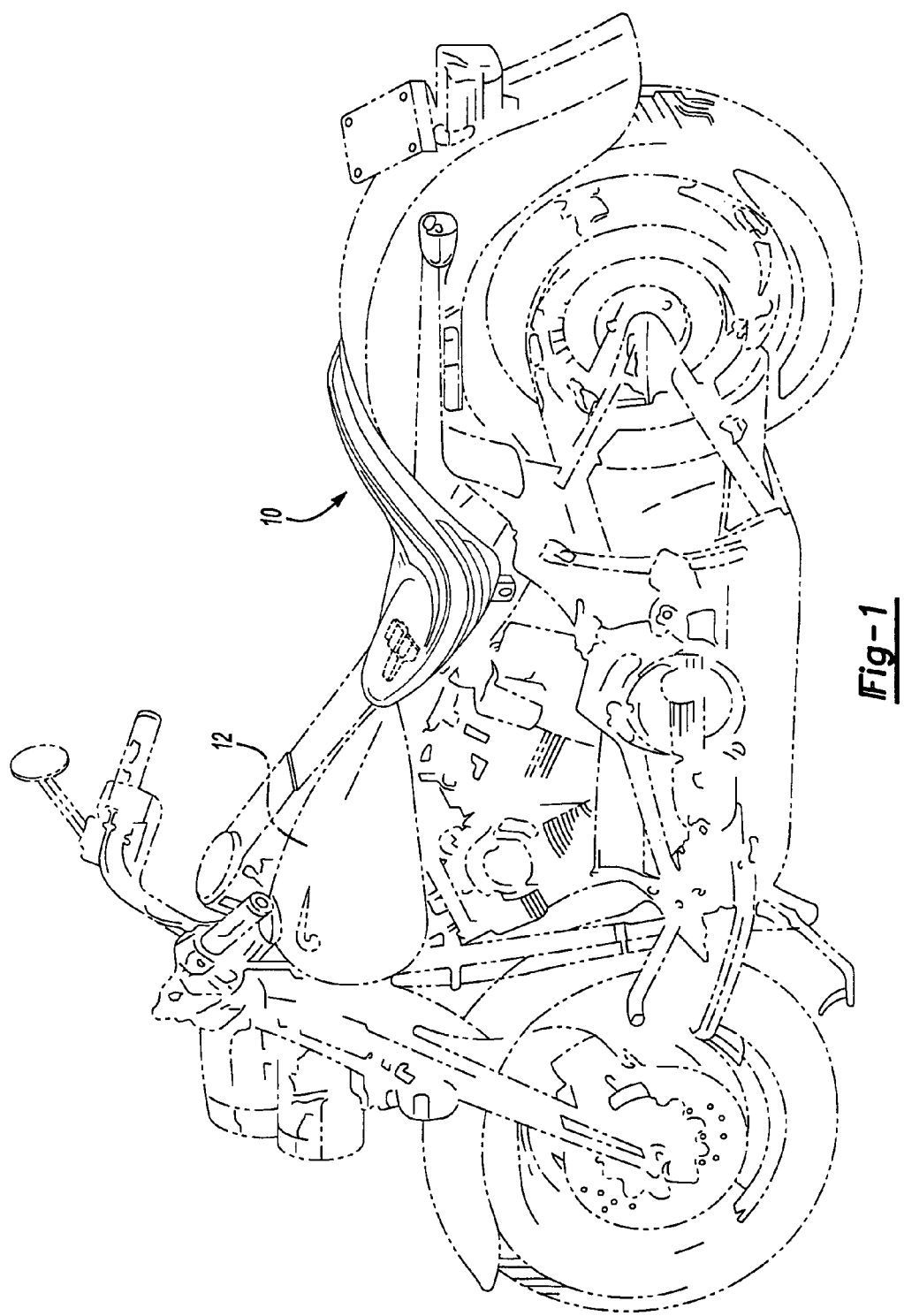
FIG. 1 is an environmental view of the structural seat for use with a motorcycle according to the present invention.

Referring to FIG. 1, a seat is illustrated at 10 for use with a wheeled vehicle 12, such typically including a motorcycle, bicycle or like wheeled vehicle. As previously described, the present invention makes possible the formation of a seat utilizing, in part, a plasticized and structural backing component suitable both for supporting the weight of a rider, as well as securing to given mounting locations associated with a frame of the motorcycle.

Figure 2:
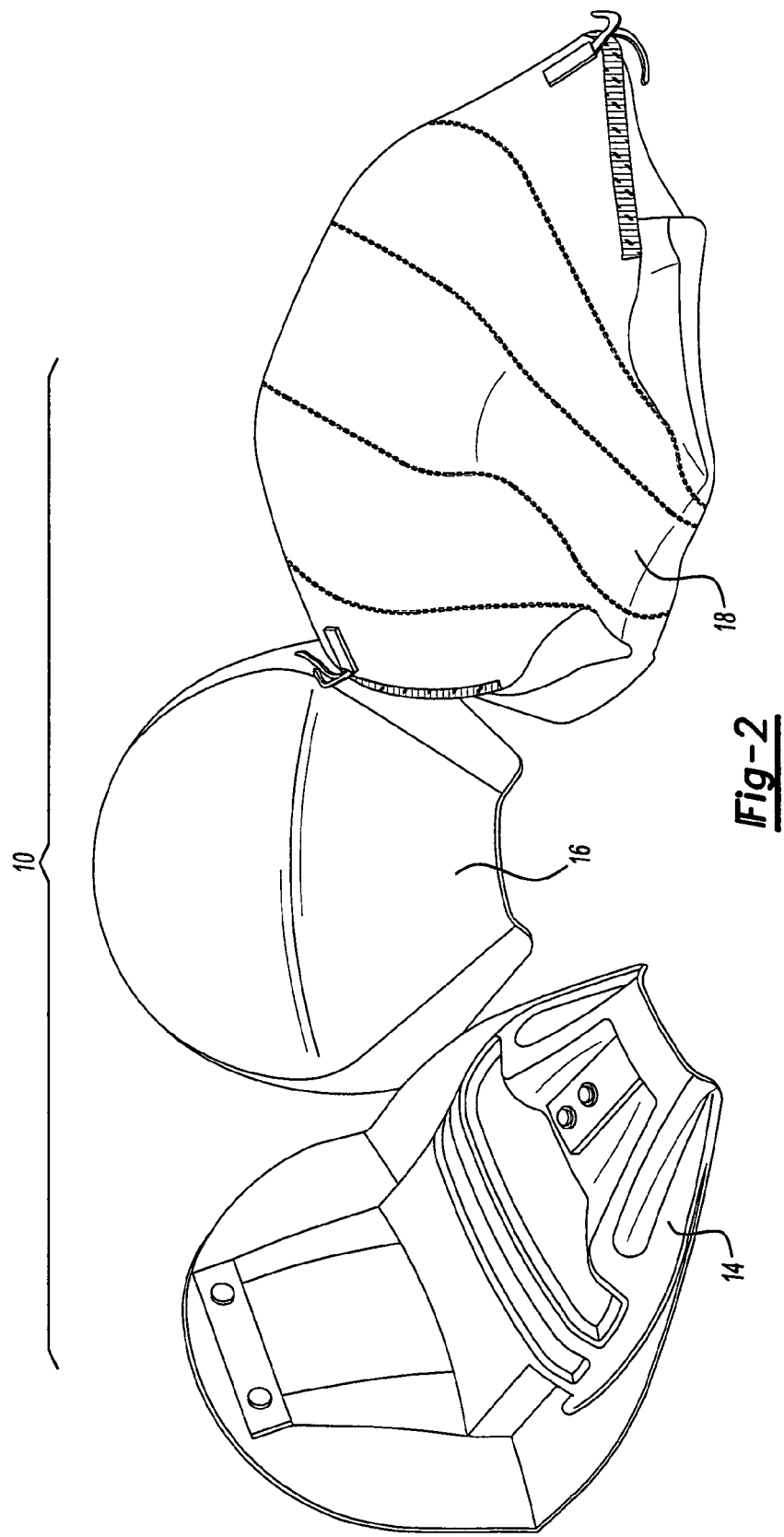
FIG. 2 is a perspective illustration in exploded fashion of the vacuum formed structural backing, preformed foam insert and outer covering components utilized in the structural seat component according to the present invention.
Figure 3:
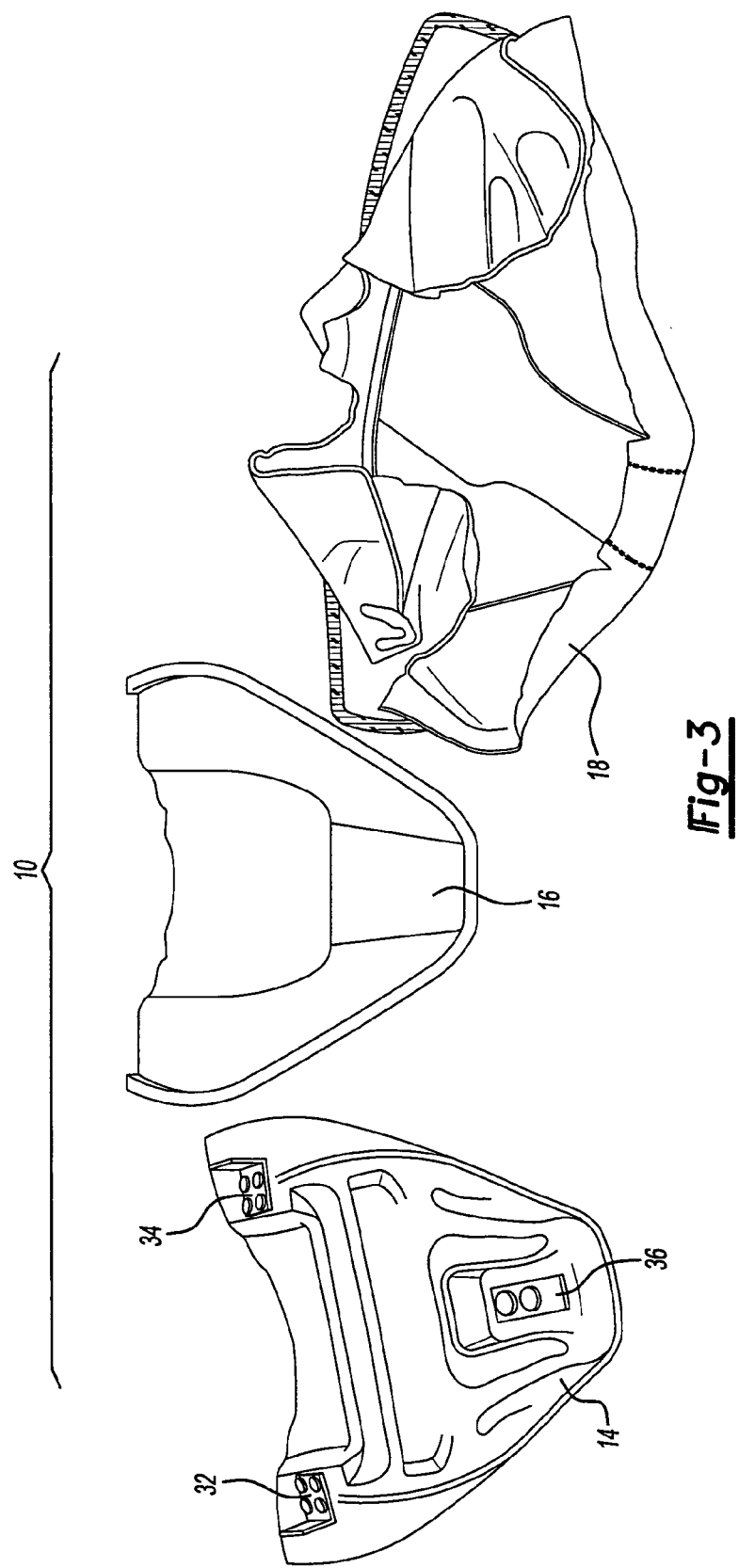
FIG. 3 is a perspective illustration, similar to that shown in FIG. 2, and illustrating the structural backing, foam insert and outer covering components in an inverted position.

Referring further to FIG. 2, a perspective illustration is shown in exploded fashion of a seat such as previously illustrated at 10 in FIG. 1. In particular, the components of the seat include a vacuum formed and structural backing 14, a preformed foam insert 16 and an outer covering 18. Referring further to FIG. 3, a reverse-sided perspective illustration is shown of the same components in FIG. 2, and again illustrating the structural backing 14, foam insert 16 and outer covering components 18 in an inverted position.

In a preferred embodiment, the structural backing 14 is constructed of an expanded polypropylene (EPP) structural foam material which exhibits the necessary properties of strength, resiliency and durability. It is also envisioned that other types of structural foam material can be utilized in the creation of the backing 14 and within the realm of the present invention.

The foam insert 16 is further typically pre-constructed of a suitable conventional material, such including a urethane or other like material exhibiting the necessary sponge-like and elasticity characteristics. Finally, the covering material 18 is typically a vinyl or leather fabric, however it likewise is not limited to any particular material construction.

Figure 4:
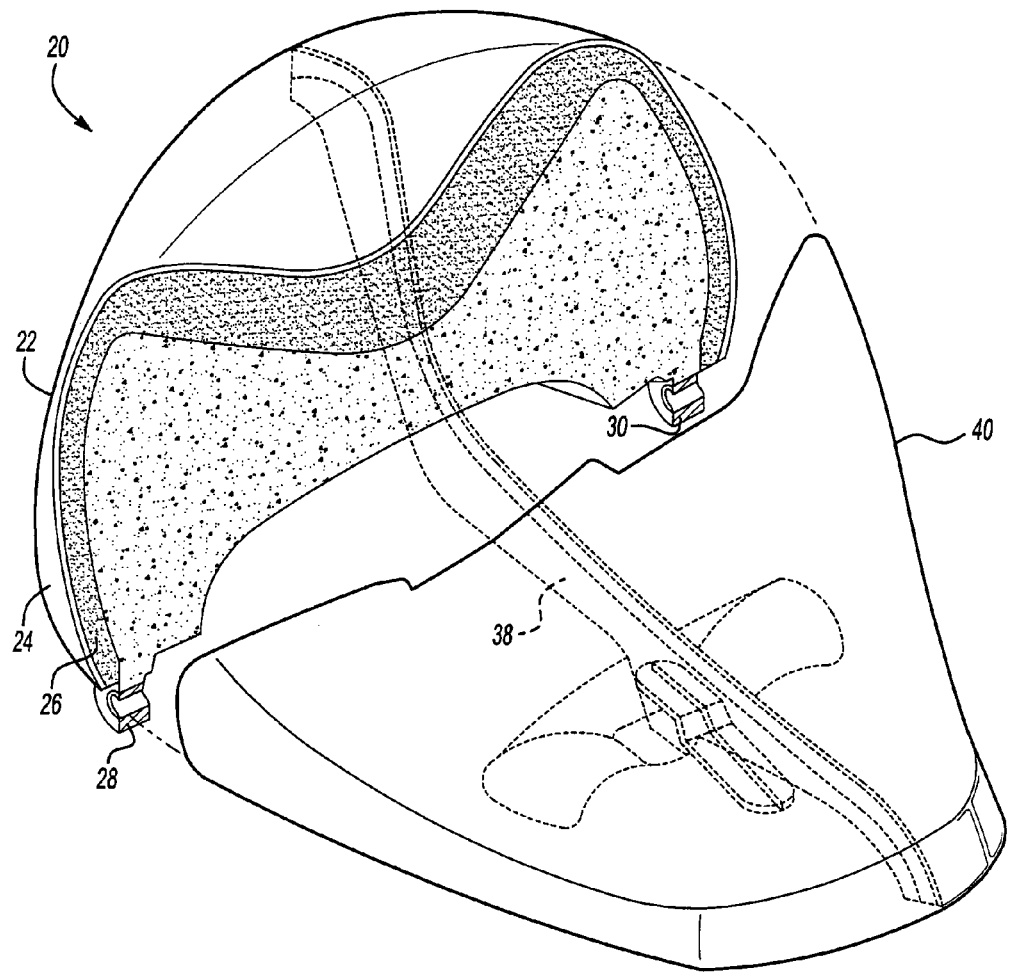
FIG. 4 is a perspective, in cutaway, of the structural seat according to the present invention.

Referring now to FIG. 4, a perspective illustration is shown at 20, in cutaway, of both seat back and seat bottom portions of a structural seat according to the present invention and which, illustrating the seat back component, includes a fabric covering 22, foam insert 24, and structural foam (EPP) backing material 26. Bracket portions 28 and 30 are illustrated extending from locations of the structural material 26 and, in the embodiment illustrated, include in-molded portions formed from the same material as the structural backing member itself.

This is in contrast to the underside illustration of FIG. 3, and by which the in-molded brackets are substituted by conventionally attached brackets 32, 34 and 36, such further including rivets and which are in turn secured to suitable locations (not shown) associated with the vehicle. Also illustrated in phantom in FIG. 4 is a frame support component 38 upon which is secured a bottom portion 40 of the seat assembly.

Figure 5:
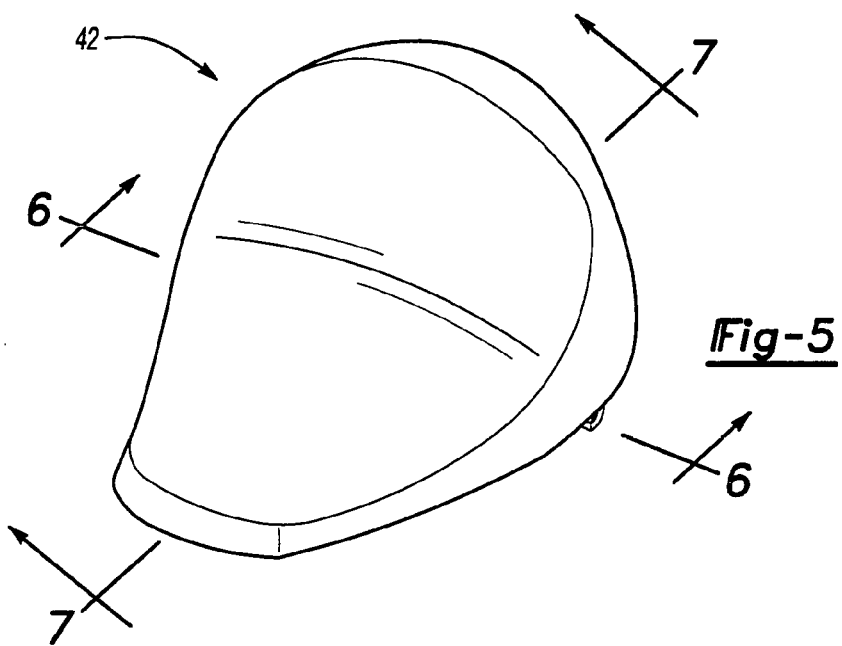
FIG. 5 is a perspective illustration of the seat illustrated in FIG. 4.
Figure 6:
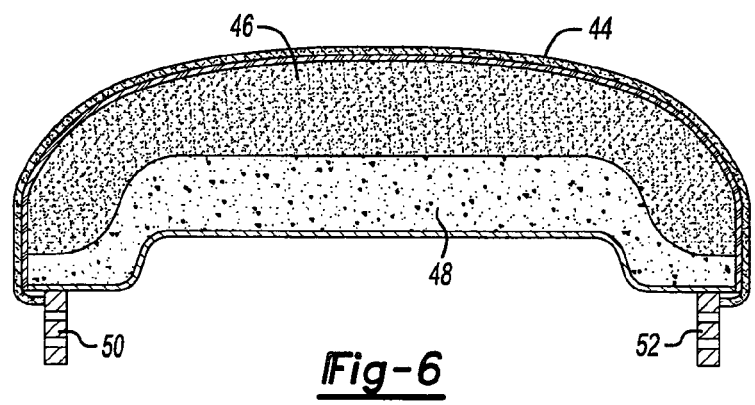
FIG. 6 is a first cutaway view, taken along line 6—6 of FIG. 5, and illustrating a given arrangement of components of the structural seat.

FIG. 5 illustrates a perspective view 42 of a seat and such as is shown also in FIG. 4. FIG. 6 is a first crosswise cutaway view, taken along line 6—6 of FIG. 5, and illustrating a given arrangement of components of the structural seat; these including a decorative covering 44, urethane foam insert 46, and structural (EPP) polypropylene foam material 48. In-molded bracket portions 50 and 52 are also illustrated in FIG. 5 and which, as previously described, may be constructed from the same material and which constitutes the structural backing material 48.

Figure 7:
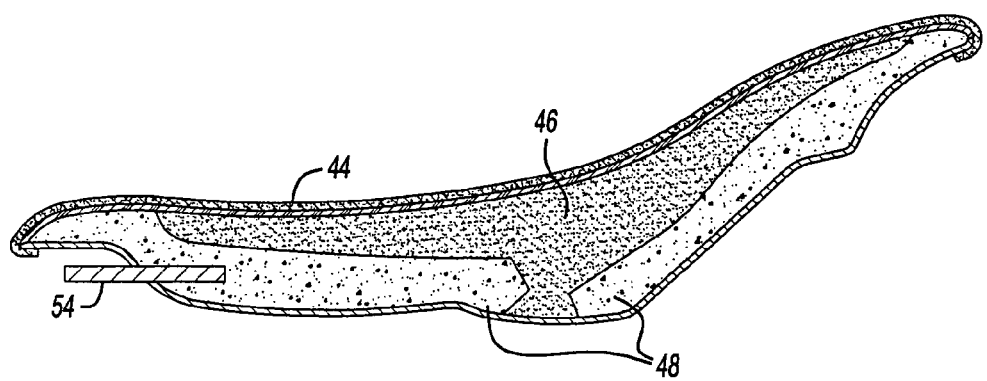
FIG. 7 is a second cutaway view, taken along line 7—7 of FIG. 5, and illustrating from another direction, the components of the structural seat.

Referring to FIG. 7, a second and axial cutaway view, taken along line 7—7 of FIG. 5, is again shown and illustrating, from another direction, the same components 44, 46 and 48 of the structural seat. An insert-molded bracket is illustrated at 54 and, in contrast to the in-molded brackets 50 and 52 shown in FIG. 6, may be provided as a metal, or other suitable, material not consistent with the material construction of the structural backing 48 and which is mechanically secured, such as in a suitable injection molding or vacuum forming process, within the structural backing 48.

Figure 8:
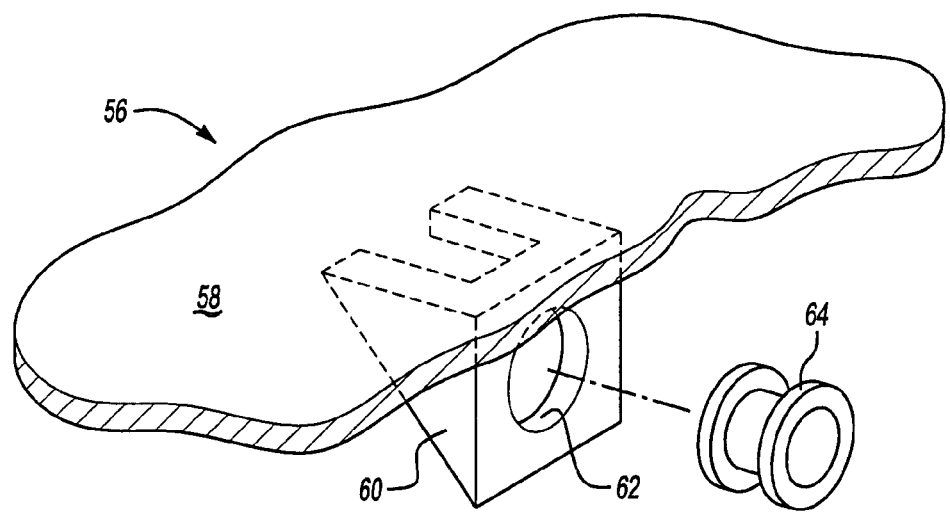
FIG. 8 is a sectional view of a molded-in bracket with rubber isolator incorporated into an embodiment of the structural seat according to the present invention.

Referring further to FIG. 8, a sectional view is shown at 56 of a molded-in bracket with rubber isolator incorporated into an embodiment of the structural seat according to the present invention. In particular, a surface 58 of the structural backing component includes a suitably configured bracket portion 60 extending therefrom, the bracket 60 typically further including an aperture 62 for receiving the rubber isolator 64 or other suitable component providing appropriate support at the vehicle mounting locations.

Figure 9:
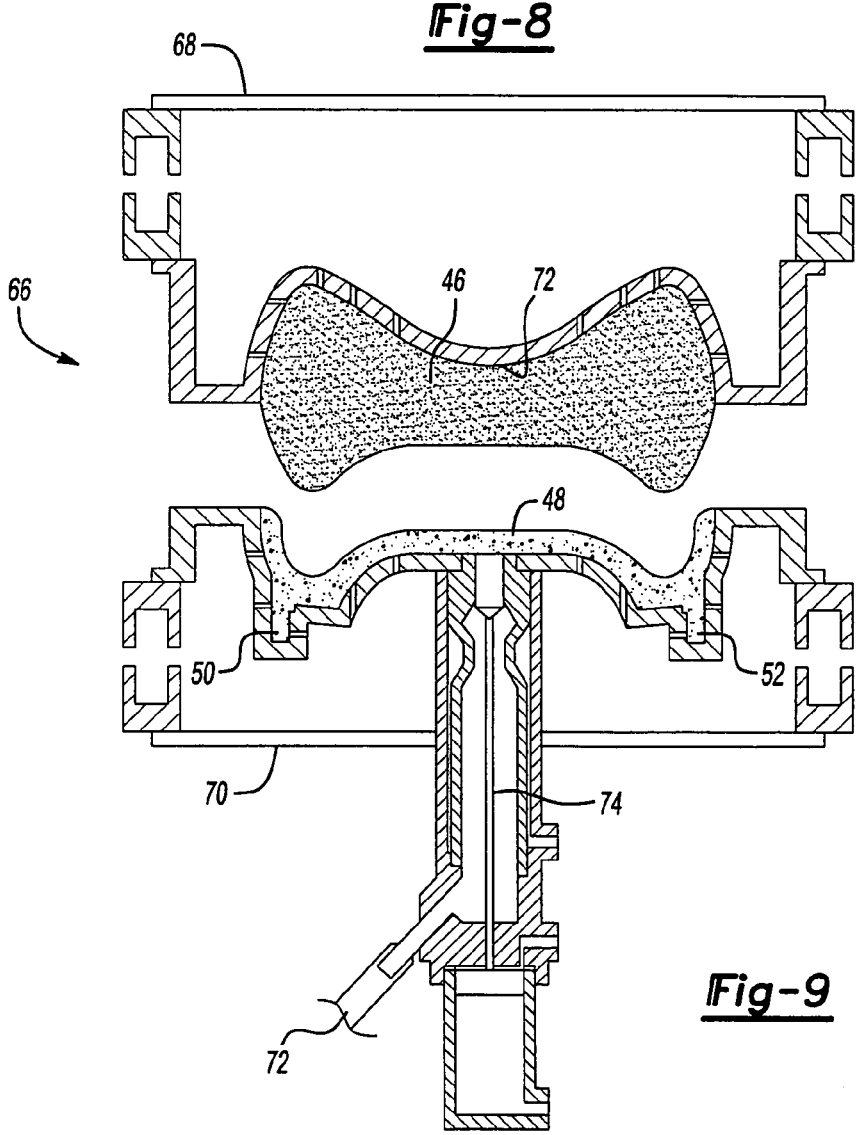
FIG. 9 is an illustration of a vacuum forming mold assembly utilized in the creation of the structural seat according to the present invention.

Referring finally to FIG. 9, an illustration is shown at 66 of a vacuum forming mold assembly utilized in the creation of the structural seat according to the present invention. In particular, the assembly illustrates an upper mold half 68 and a lower mold half 70. A three-dimensional and conventional foam insert is illustrated at 46 and which mates generally with a negative outline 72 associated with an inner exposed surface of the upper mold half 68. Although not illustrated, it is understood that a decoration may be applied over a surface of the foam material and it is further envisioned that such a vinyl or leather material can be applied either prior to or subsequent to the molding process.

The structural backing material, such as previously illustrated at 48, is illustrated in adhering fashion to the inner exposed surface associated with the lower mold half 70 and which is further illustrated as including the in-molded bracket portions 50 and 52. A conduit 72 extends to the lower mold half 70 and, in combination with a vacuum forming assembly 74, causes a specified volume of the EPP (or other suitable structural backing) material (heated) to flow over the exposed surface of the lower mold 70 prior to setting and curing. It is also understood that, although not shown, other types of injection molding processes can be utilized for producing the structural seat component.

A method for fabricating a seat for use with a vehicle is also disclosed and which includes the steps of placing in a mold a three-dimensional shaped insert constructed of a foam material, vacuum forming a structural foam material against a first surface of the foam insert, integrally forming at least one bracket with the structural backing, and applying a fabric covering material over a second surface of said foam material. Additional steps include in-molding the bracket with the structural backing material, alternatively insert molding a bracket of another material, typically mechanically, with structural backing material, and attaching at least one rubber isolator component to the bracket.

Having described my invention, other and additional preferred embodiments will become apparent to those skilled in the art to which it pertains, and without deviating from the scope of the appended claims:

We claim:

1. A seat for use with a vehicle, comprising:
    a three-dimensional shaped insert constructed of a foam material;
    a structural foam backing secured to a first surface of said foam material, said structural backing further comprising at least an expanded polypropylene material;
    at least one bracket being insert-molded with said structural backing, such that a portion of said bracket is embedded within said structural backing and a further portion projects from said structural backing, said bracket being adapted to engage a location of the vehicle;
    a frame support component upon which is secured a bottom portion of said structural backing; and
    a fabric covering material applied over a second surface of said foam material.

2. The seat for use with a vehicle as described in claim 1, said seat exhibiting a specified shape and size and said foam material further comprising at least a urethane material.

3. The seat for use with a vehicle as described in claim 1, said seat exhibiting a specified shape and size, said fabric covering material comprising at least one of a vinyl and a leather material.

* * * * *